J. DAVIS.
Grain-Drill.
No. 36,898. Patented Nov. 11, 1862.
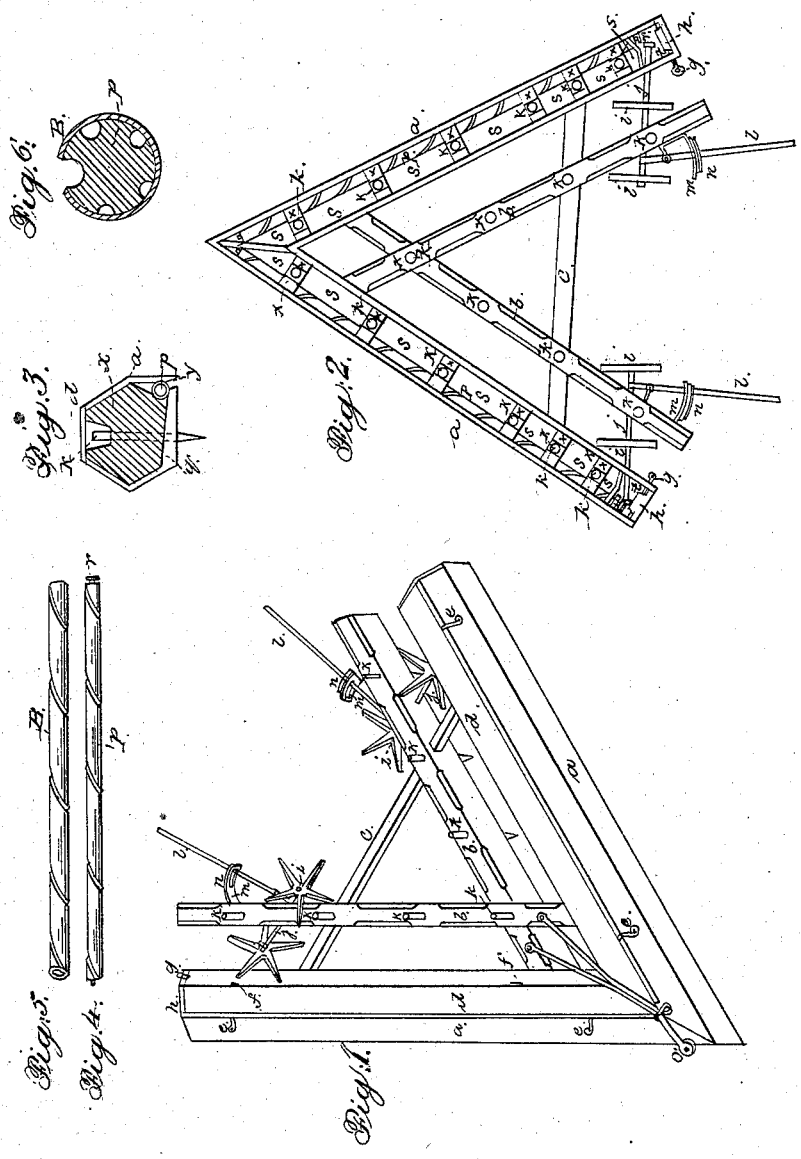

UNITED STATES PATENT OFFICE.

JOHN DAVIS, OF ALLEGHENY CITY, PENNSYLVANIA.

IMPROVEMENT IN SEED-SOWING HARROWS.

Specification forming part of Letters Patent No. 36,898, dated November 11, 1862.

*To all whom it may concern:*

Be it known that I, JOHN DAVIS, of Allegheny city, in the county of Allegheny and State of Pennsylvania, have invented a new and useful Improvement in Seed-Sowing Harrows; and I do hereby declare that the following is a full and exact description thereof, reference being had to the accompanying drawings, and to the letters of reference marked thereon.

The nature of my invention consists in furnishing a harrow with seed-chambers and rollers for depositing the seed, also in an arrangement of suitable gearing and driving-wheels for operating the rollers, the whole being arranged, combined, and operated in the manner hereinafter described.

In the accompanying drawings, Figure 1 is a perspective view of the harrow. Fig. 2 is a sectional view of the same. Fig. 3 is a sectional view of the outer bars. Fig. 4 is a side or face view of the rollers for depositing the seed. Fig. 5 is a side or face view of the case or sheath of the rollers used for depositing the seed. Fig. 6 is a sectional view of a roller and sheath, and represents the roller furnished with a number of grooves of different depths and size.

$a\ a$ are the outer bars of the harrow.

$b\ b$ are the inner bars.

$c$ is the brace for the bars $a$ and $b$.

$d\ d$ are the lids of the seed-chambers.

$e$ is hooks or clasps for holding the lids $d$ down to their place.

$f$ represents the hinges of the lids $d$.

$g$ represents pins which are used for holding in place the ends $h$ of the bars $a$. The end pieces, $h$, are made movable, for the purpose of inserting and removing the seed-rollers.

$x$ represents the division-pieces, which are used for dividing the hollow bars $a$ into a series of seed-chambers, and are also used for holding and supporting the harrow-teeth $k$.

$p$ represents the rollers used for depositing the seed. These rollers are furnished with a number of spiral grooves, of different depths and size, for the purpose of sowing different kinds of seed and different quantities of the same kind.

B is a case or sheath, which is placed over the rollers $p$, and is furnished with a spiral opening corresponding to the grooves in the rollers $p$, and is used for the purpose of covering all the grooves except the one desired for use in sowing, and may be held in the desired position by any known device.

$i$ represents the driving-wheels, which are secured on the shafts $j$.

$r$ represents the bevel-gearing, used for turning the rollers $p$. This bevel-gearing is placed in the chambers $t$ of bars $a$, and is thrown into and out of gear by means of the levers $l$, which are held in the desired position by the catches $m$ and springs $n$. It will be observed that in Fig. 2 one roller is represented in gear and the other out of gear. The bottom of the seed-chambers $s$ is inclined, so that seed will fall toward roller $p$. (See Fig. 3.)

The operation of my improvement is as follows: Having the sheath adjusted as desired on the roller, and the chambers filled with seed, the drawing-power is attached to the clevis $o$, and the motion and weight of the harrow will cause the wheels $i$ to revolve, which will revolve the shaft $j$, which will revolve the wheels or gearing $r$, which will turn the rollers and sheath, which will deposit the seed through the opening $y$ onto the ground, where it will be harrowed in by the teeth $k$.

Having thus described the nature, construction, and operation of my improvement, what I claim as of my invention, and desire to secure by Letters Patent, is—

The rollers $p$ and sheath B, constructed and operated substantially as described, and used in combination with the seed-chambers $s$, furnished with the inclined bottom, as herein represented, and for the purpose set forth.

JOHN DAVIS.

Witnesses:
 JAMES J. JOHNSTON,
 JOHN WOODS.